Dec. 21, 1954
J. R. OISHEI
2,697,241
WINDSHIELD WIPER
Filed Nov. 24, 1950
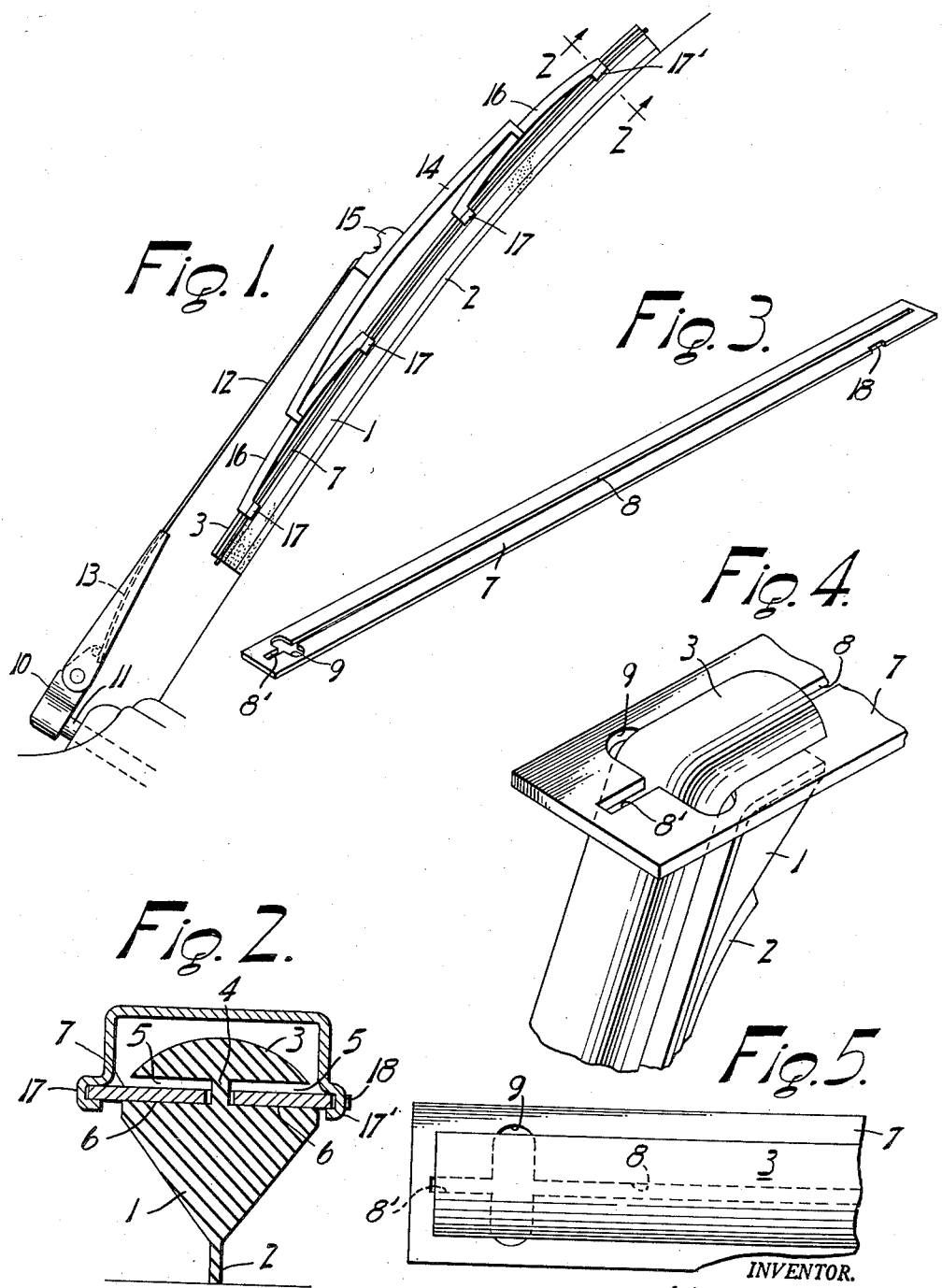
INVENTOR.
John R. Oishei
BY
Bean, Brook, Buckley & Bean.
ATTORNEYS

United States Patent Office 2,697,241
Patented Dec. 21, 1954

2,697,241
WINDSHIELD WIPER

John R. Oishei, Buffalo, N. Y., assignor to Trico Products Corporation, Buffalo, N. Y.

Application November 24, 1950, Serial No. 197,335

2 Claims. (Cl. 15—245)

This invention relates to the windshield cleaning art and particularly to the wiper. In the cleaning of curved windshields the wiping blade is made flexible to follow the surface curvature during the wiping stroke.

The primary object of this invention is to provide an economical wiper which embodies a high degree of flexibility that insures accurate surface conformance to a nicety to secure the greatest efficiency.

A further object is to provide a wiper of few parts which are simple in design to facilitate assembly and to insure effective cleaning of the curved surface.

The foregoing and other objects will manifest themselves as this description progresses, reference being made to the accompanying drawing wherein Fig. 1 is a side elevation of the improved wiper in its operative position upon a windshield;

Fig. 2 is a cross sectional view thereof on line 2—2 of Fig. 1;

Fig. 3 is a perspective view of the flexible backing member;

Fig. 4 is a fragmentary detail view in perspective depicting the manner of assembling the squeegee element on its backing member; and Fig. 5 is a plan view of one end of the squeegee unit thus formed by assembling the squeegee and backing parts.

Referring more particularly to the accompanying drawing, the numeral 1 designates the squeegee body preferably formed of rubber and having a flexible wiping edge 2 along one margin and a retaining head or bead 3 along its opposite margin, the head being joined by a neck 4 to the body. The neck is reduced to a narrow dimension by the lateral grooves 5 to enable it to readily flex and even stretch in order to secure the desired surface conformance in its wiping contacts.

This formation constitutes the lower sides 6 of the grooves as seats for the backing member 7, which latter is economical in design. It consists of a flat spring strip and may therefore, when of metal, be the product of a simple stamping operation that requires no further shaping or assembling fabrication. This strip 7 is flexible and formed with a narrow slot 8 for receiving the neck 4, the slot extending along the longitudinal center of the strip and terminating short of its ends. To facilitate the introduction of the neck into the slot, there is provided a transverse entrance opening 9 of sufficient size to pass the bead 3 upwardly therethrough to dispose it on the upper face of the strip. The entrance opening is near one end of the slot and divides the same into a major portion and a minor portion, the length of the major portion being such that the squeegee body may be compressed lengthwise thereinto for being thereafter released to permit the body expanding across the entrance opening and into the minor portion 8', as illustrated in Fig. 5, to occupy the slot for its full length. As shown in Fig. 2, ample clearance is provided within the grooves 5 and between the edges of the slot 8 and the neck 4 to permit the latter to freely adjust itself in the backing member as it conforms to the windshield contour in wiping thereover.

The squeegee unit comprises only these two parts 1 and 7 which, when united, are interlocked into a resilient blade that is readily conformed to the windshield surface under the spring urge of the well known wiper arm. This arm is illustrated in Fig. 1 as having an inner section 10, that is mounted on the oscillatory actuating shaft 11, and an outer section 12 that is hinged to the inner section and placed under the urge of the spring 13.

A holder 14 for the squeegee unit is connected to its carrying arm 10, 12 by a connector 15 and has its opposite ends coupled to the backing member by rockable secondary holders 16, each of which latter terminates at its opposite ends in pairs of opposed seats or jaws 17 that slidably grasp the opposite longitudinal margins of the flexible backing strip 7. These jaws serve to support the squeegee unit operative and further provide longitudinally spaced points of pressure contact at which the spring urge from the arm is applied. To secure the unit against displacement one jaw 17' may be adapted to interlock in a notch or recess 18 in an edge of the backing 7.

To assemble the parts of the squeegee unit the anchoring bead 3 is passed through the entranceway, as provided by the cross slot 9, while the neck is being threaded into the longitudinal slot. The rubber body 1 is compressed lengthwise of the backing strip to enter its entire length within the slot and thereafter the pressure is released and the rubber expanded to its normal length to fill the slot to its full extent. The cross slot 9 is preferably located close to one end of the slot 8 in order to provide support for the adjacent extremity of the rubber body.

The squeegee unit is exceedingly simple in construction. Its parts may be expeditiously assembled. The backing strip is a plain one-piece unit and may be formed of suitable material or it may comprise a metal stamping. The unit may therefore be economically produced, and while the foregoing description has been given in detail, it is without thought of limitation since the inventive principles involved are capable of assuming other physical embodiments without departing from the spirit of the invention and the scope of the appended claims.

What is claimed is:

1. A windshield wiper having an elongate flexible wiping body with an anchoring bead extending along one margin and supported by a reduced neck, and a flexible backing therefor constituting a one-piece stamping in the form of a flat metal strip with a longitudinal neck-receiving slot terminating short of the opposite ends of the strip, the slot having a transversely enlarged entrance opening intersecting the slot adjacent one end for passing the anchoring bead when threading the neck into the first slot such entrance opening dividing the slot intermediate its ends for receiving and supporting the anchoring bead at opposite sides of the opening as by compressing said wiping body lengthwise thereof after threading the neck portion thereof into the longer section of said divided slot and then releasing the pressure to permit the wiping body to expand to its normal length to fill the opposite section of said slot.

2. In combination with an elongate flexible wiping body having an anchoring bead extending along one margin and supported by a reduced neck, a flexible backing for said wiping body, said backing comprising a one-piece perimetrically enclosed stamping in the form of a flat flexible strip with a longitudinally extending neck-receiving slot closed at its opposite ends and having an enlarged entrance opening in its length permitting the lengthwise insertion of the neck into the slot as by compressing said wiping body and anchoring enlargement lengthwise thereof after threading thereof into the portion of said slot on one side of said entrance opening and then releasing the pressure so that the wiping body will expand to its normal length to fill the portion of said slot on the opposite side of said entrance opening, the opposite side margins of the strip providing longitudinally extending edge portions for mounting the backing.

References Cited in the file of this patent

UNITED STATES PATENTS

| Number | Name | Date |
|---|---|---|
| 2,069,219 | Conlon | Feb. 2, 1937 |
| 2,548,090 | Anderson | Apr. 10, 1951 |
| 2,596,063 | Anderson | May 6, 1952 |

OTHER REFERENCES

Anco Catalogue of November 1946, pages 2–3, The Anderson Company, Gary, Indiana.